(12) United States Patent
Sawada

(10) Patent No.: US 7,211,784 B2
(45) Date of Patent: May 1, 2007

(54) PHOTO-DETECTION DEVICE AND TEMPERATURE DISTRIBUTION DETECTION DEVICE USING THE SAME

(75) Inventor: Akira Sawada, Kiyose (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 121 days.

(21) Appl. No.: 11/078,333

(22) Filed: Mar. 14, 2005

(65) Prior Publication Data
US 2005/0205766 A1    Sep. 22, 2005

(30) Foreign Application Priority Data

Mar. 16, 2004 (JP) ............................ 2004-075042
May 24, 2004 (JP) ............................ 2004-153295

(51) Int. Cl.
*G02B 6/26* (2006.01)

(52) U.S. Cl. ............................ 250/227.24; 250/227.11; 385/137

(58) Field of Classification Search ........... 250/227.11, 250/227.2, 227.24, 221, 341.6; 385/12, 88–89, 385/137
See application file for complete search history.

(56) References Cited

U.S. PATENT DOCUMENTS 4,508,461 A    4/1985  Lambert
2003/0174944 A1*  9/2003  Dannoux et al. ............. 385/33

FOREIGN PATENT DOCUMENTS

| JP | 5-293779 | 11/1993 |
| JP | 7-360 | 1/1995 |
| JP | 2002-206968 | 7/2002 |

* cited by examiner

*Primary Examiner*—Kevin Pyo
(74) *Attorney, Agent, or Firm*—Oblon, Spivak, McClelland, Maier & Neustadt, P.C.

(57) ABSTRACT

A photo-detection device comprising a base plate made of an insulation material and having a plurality of through holes formed in the base plate at a substantially equal distance, a plurality of optical fibers each having one end including a light receiving section from an object to be detected inserted and fixed to the respective through holes and another end provided with a light output section, and a light detection section connected to the light output section.

12 Claims, 12 Drawing Sheets

F I G. 19A (Material A)

F I G. 19B (Material B)

F I G. 19C (Material C)

PHOTO-DETECTION DEVICE AND TEMPERATURE DISTRIBUTION DETECTION DEVICE USING THE SAME

CROSS-REFERENCE TO RELATED APPLICATIONS

This application is based upon and claims the benefit of priority from prior Japanese Patent Applications No. 2004-075042, filed Mar. 16, 2004; and No. 2004-153295, filed May 24, 2004, the entire contents of both of which are incorporated herein by reference.

BACKGROUND OF THE INVENTION

1. Field of the Invention

The present invention relates to a photo-detection device wherein an infrared light or visible light radiated from or reflected by a surface of an object to be detected is guided to and detected at a position separated from the object through an optical fiber, and a temperature distribution detection device using the same to form a temperature distribution image or a visible image of a surface of the object.

2. Description of the Related Art

There is a conventional image capture method for forming an image of an object at a narrow place to which a man cannot access in an atomic power generation plant, for example. Such a method is shown in a Japanese Patent Application KOKAI Publication No. 05-293779, for example. According to the described method, a mirror supported by a supporting mechanism is inserted in the narrow place to extract an image light of the object to an external, so that an image of the object in the narrow place is captured optically. The direction of the mirror should be changed when an image of a desired position in the narrow place is to be captured. In order to change the mirror direction, it is necessary to provide a driving mechanism in the mirror supporting mechanism, thereby rendering the device be bulky. Moreover, since the driving mechanism should be provided with a movable part, the tolerance of movement of the movable part is limited at a very narrow place, thereby disabling the image capture of a desired object.

Further, there is a demand for inspecting a heat generation status of electronic parts mounted on a given mounted circuit board (a printed circuit board on which electronic elements are mounted is called as the mounted circuit board) in a state where a plurality of mounted circuit board including the given mounted circuit board are juxtaposed with narrow spaces.

In this case, a mirror driving mechanism provided with a mirror is inserted in a narrow space between the given mounted circuit board and an adjacent mounted circuit board, while a current is supplied to the given mounted circuit board from an electric power source. However, when the mirror driving mechanism is formed of an electric conductive material such as iron or aluminum, a short circuit may occur on the surface region of the current-supplied given mounted circuit board which may be destroyed.

A method for taking out a light from an object in a narrow space by means of a single optical probe to capture an image of the object is shown in a Japanese Patent Application KOKAI Publication No. 07-360. The optical probe used in the method shown in this publication has a narrow view angle and narrow view range of an image to be captured. When it is desired to capture an image of a part laid outside of the view range, the position of the optical probe or the optical axis of the optical probe should be moved to face the optical probe with the object. The position of the probe and the direction of the optical axis of the optical probe may be moved by hand or by changing the tension of a steel wire coupled to the optical probe. However, such a structure and a method for handling to realize this method are complicated and require much time to capture the image. Particularly, it is not possible to obtain a temperature distribution image of a wide range correctly at the same time.

Further, a method of detecting a temperature distribution image for a wide range by moving a mirror inserted in a narrow place is disclosed in a Japanese Patent Application KOKAI Publication No. 2002-206968. However, this method also requires an actuator for driving a mirror to render a structure and handling for realizing this method are also complicated and the operation for detecting the temperature distribution may be restricted.

Further, when a mirror and the like is driven in the narrow space for capturing a temperature distribution image, the air in the narrow space will be stirred. As a result, a local cooling or local heating will be occurred with respect to the surface of the object in the narrow space that it is not possible to obtain a correct temperature distribution image. Further, when a frame of a mirror or the like is moved within the narrow space between the two adjacent circuit boards, there is a possibility of occurring disadvantages such as a short-circuiting of the mounted electrical parts on the circuit board which causes the destruction of the circuit board.

This third method is also restricted by the size or weight of the mirror inserted in the narrow space and cannot be used to obtain a wide range visible image or a wide range temperature distribution image at the same time as in the first method. When a temperature distribution in the narrow space is detected, an infrared light radiated from an object to be detected should be merely detected. However, when a visible image is detected, it is necessary to irradiate the object to be detected by a visible light. To this end, a separate optical cable system for irradiating the object is necessary in addition to the optical cable for the infrared image detection optical probe. As a result, the total diameter of the optical cable becomes large so that it becomes difficult to insert such the thick optical cable into the narrow space. Further, a plurality of optical fibers to be connected to the optical probe becomes necessary in order to increase the resolution the obtained image.

Accordingly, since a range of view to be detected is restricted in the conventional methods, it is necessary to move an optical probe or the mirror in a narrow space for obtaining a wide range temperature distribution image or a wide range visible image. In other words, it is not possible to obtain the wide range temperature distribution image or the wide range visible image at the same time without moving the optical image or the mirror. Therefore, when the temperature distribution image or visible image changes frequently in a short period of time, it is not possible to obtain the images correctly.

BRIEF SUMMARY OF THE INVENTION

According to one aspect of the present invention, there is provided a photo-detection device comprising:

a base plate made of an insulation material and having a plurality of through holes formed in the base plate at a substantially equal distance; a plurality of optical fibers each having one end including a light receiving section from an object to be detected inserted and fixed to the respective through holes and another end provided with a light output section; and a light detection section connected to the light output section.

According to another aspect of the present invention, there is provided a temperature distribution detection device comprising: a detection base plate made of an insulation material and having a plurality of through holes formed at substantially the same distance; a plurality of optical fibers each having a light receiving section for receiving a light from an object to be detected at one end thereof, the one end being inserted and fixed into the through holes, and having a light output section at the other end; a light detection section connected to the light output section to form a light detection signal corresponding to an intensity of the light output from the light output section; and an image forming section for forming an image representing temperature distribution of the object in accordance with an output formed at the light detection section.

DETAILED DESCRIPTION OF THE INVENTION

Figures 1, 3:
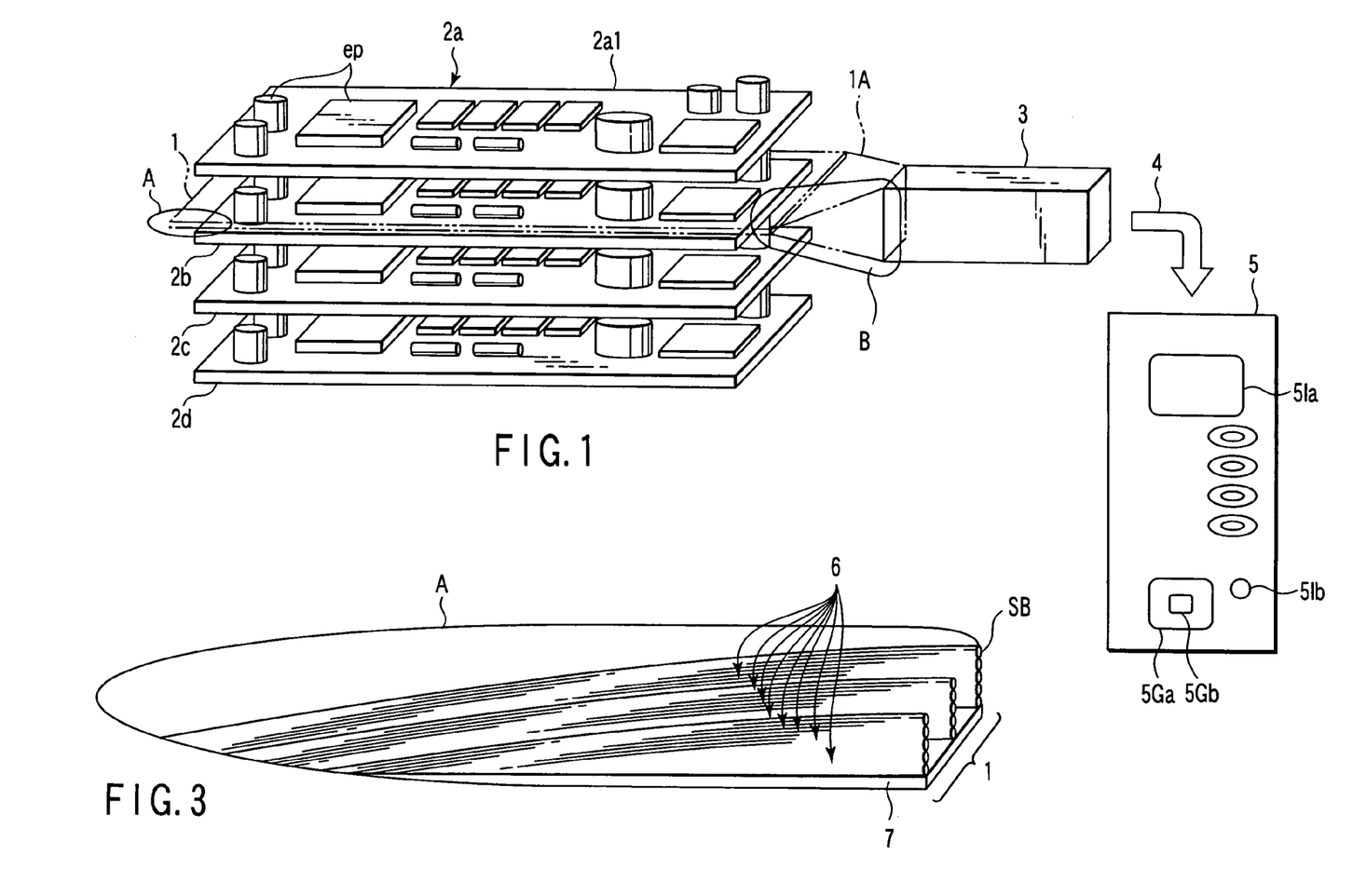
FIG. 1 is a block diagram explaining the structure of a temperature distribution detection device according to a first embodiment of the present invention.
FIG. 3 is an enlarged view showing a detailed structure of a part of the optical probe indicated by a circle A.
Figure 2:
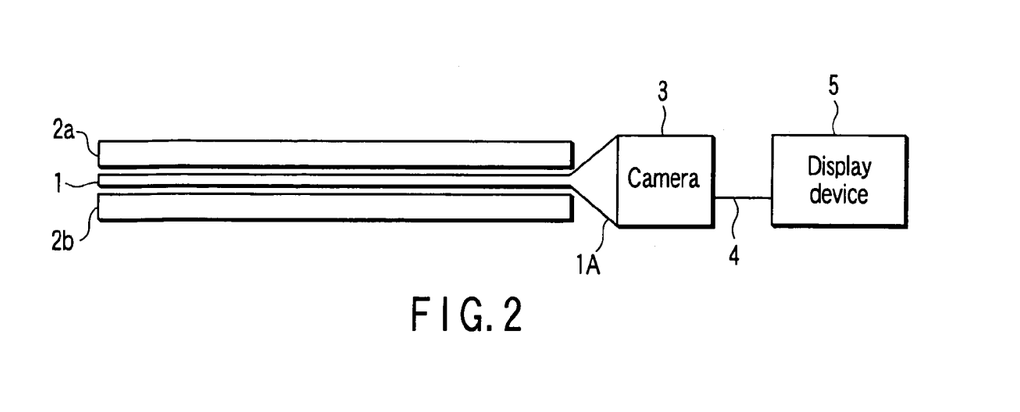
FIG. 2 shows a side view of two printed circuit boards between which the temperature distribution detection device shown in FIG. 1 is inserted.

A first embodiment of the present invention will be described by referring to FIG. 1. In FIG. 1, an optical probe 1 according to the embodiment of the present invention is inserted in a narrow space formed between mounted circuit boards 2a and 2b. The mounted circuit board 2a is composed of a printed circuit board 2a1 on which a plurality of electronic parts ep are mounted. In the figure, four mounted circuit boards 2a, 2b, 2c and 2d in which the circuit boards 2b to 2d are constructed in the similar manner as the board 2a are shown. These mounted circuit boards 2a to 2d are held on a frame (not shown) in a horizontal direction at substantially equal distances. FIG. 2 a side view showing a state in which the optical probe 1 is inserted between the mounted circuit boards 2a and 2b.

In FIG. 1, the light receiving surface of the optical probe 1 is directed downwardly, namely, in the direction facing the mounted circuit board 2b, so that the temperature distribution of the electronic parts ep can be detected from a side of the mounted circuit board 2b on which the electronic parts ep are mounted. One end surface of the optical probe 1 facing the mounted circuit board 2b has a light receiving surface for detecting the temperature distribution of the mounted circuit board 2b and the other end of the optical probe 1 has an eyepiece side or a light outputting section 1A for delivering the received light externally.

The optical probe 1 is constituted by a plurality of optical fibers. The optical probe 1 inserted between the mounted circuit boards 2a and 2b has a structure in which a plurality of optical fibers 6 are arranged on a probe base plate 7 as shown in FIG. 3 in which the portion encircled by a circle A in FIG. 1 is illustrated. In FIG. 3, three sub-bundles SB each including five optical fibers 6 stacked vertically are arranged side by side in a parallel fashion with a predetermined distance with each other on the probe base plate 7. The probe base plate 7 is formed of a flexible and thin insulation resin plate having a thickness of 1 mm, for example. The diameter of the optical fiber 6 is 0.3 mm, for example. Therefore, the thickness of the sub-bundle SB having five optical fibers 6 being stacked is about 1.5 mm, so that the total thickness of the optical probe 1 having the probe base plate 7 and the sub-bundle SB coated with an insulating resin (not shown) will be 2.5 mm. Thus, a thin optical probe 1 is formed so that it is possible to be inserted into a narrow space between the mounted circuit boards 2a and 2b, for example.

Figure 4:
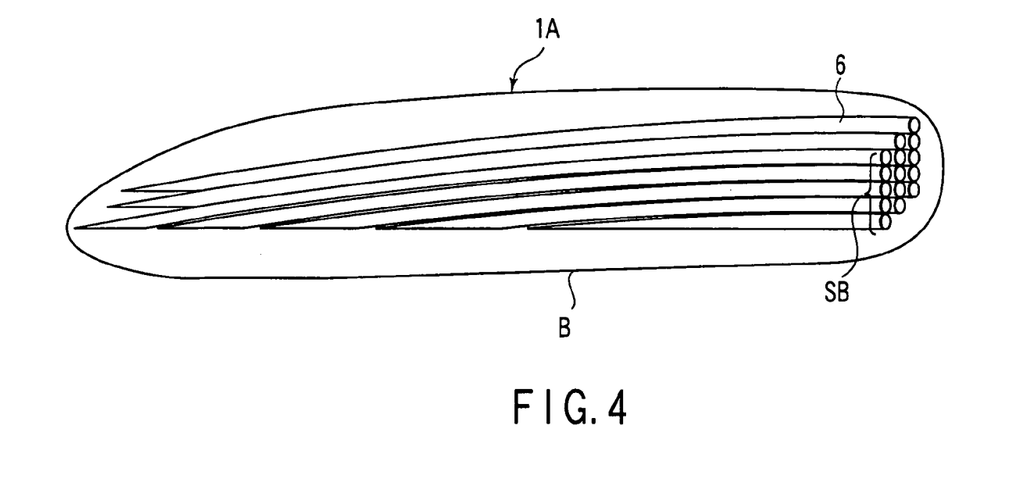
FIG. 4 is an enlarged view showing a detailed structure of a light receiving section of the optical probe.

The plurality of sub-bundles SB are extended to the side of the light outputting section 1A which is encircled by a circle B at which the sub-bundles SB are bundled to have a square section as shown in FIG. 4 in which the side surfaces of the sub-bundles SB are contacted with each other. As a result, the light outputting section 1A has an optical fiber array having light outputting ends of the optical fibers 6 arranged as a matrix.

As shown in FIGS. 1 and 2, infrared lights radiated from the surface of the mounted circuit board 2b is received by the plurality of optical fibers 6 at the light receiving section of the optical probe 1 is guided through the optical fiber array acting as a light guiding means to an infrared camera 3 acting as a temperature distribution detection means. The temperature distribution detection image of the mounted circuit board 2b obtained at the infrared camera 3 is displayed on a display device such as a liquid display device 5.

The optical probe 1 is constituted of a probe base plate 7 having a detection surface facing (or contacting) to the mounted circuit board 2b and a plurality of optical fibers 6 each of which is implanted into the probe base plate 7 so that the tip end of the optical fiber 6 is exposed at the detection surface of the plate 7. The tip end of the optical fiber 6 has an end surface perpendicular to the optical axis of the fiber 6 which is perpendicular to the surface of the probe base plate 7. An objective lens 8 is provided at the tip end of the optical fiber 6. The end surfaces of the optical fibers 6 are light receiving surfaces arranged on the surface of the probe base plate 7 in a two dimensional manner. The probe base plate 7 is made of an insulation resin or a plastic and is formed as a honeycombed shape to hold the plurality of optical fibers 6. Practically, a plurality of hexagonal through holes 7a are formed on the probe base plate 7 and a plurality of fiber insertion holes 7b are formed in the connection frame between the hexagonal through holes 7a. The tip ends of the optical fibers 6 are held in the holes 7b so that the optical fibers 6 are fixed perpendicularly on the probe base plate 7.

Figure 6:
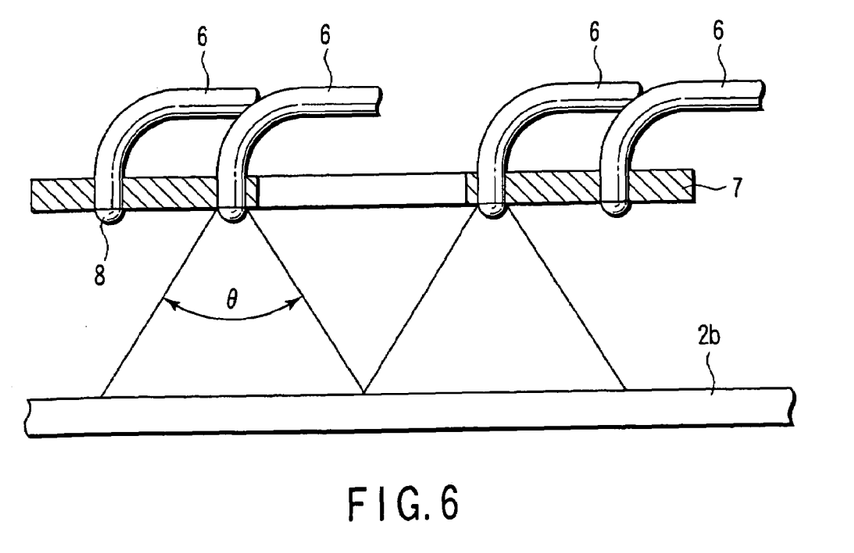
FIG. 6 is a sectional view showing a detailed structure of a top part of the optical probe shown in FIG. 6.

Further, an objective lens 8 is formed at the tip end or the light receiving surface of the each optical fiber 6. The objective lens 8 is a convex lens focused on the surface of the mounted circuit board 2b and has a view angle θ so that the field of views of the adjacent optical fibers 6 are contact with each other, as shown in FIG. 6. The objective lens 8 may be formed, for example, by the following manner. First, a tip part of the optical fiber 6 is melted. In the melted state, the material of the optical fiber 6 is formed as a semi-spherical shape at the tip end of the optical fiber according to its surface tension. When the tip end of the optical fiber 6 is cooled, a convex lens is formed integrally with the optical fiber 6 by the material forming the optical fiber 6. However, the convex lens 8 may be formed of a material other than that forming the optical fiber 6 and the separately formed convex lens 8 is contacted at the tip end of the optical fiber 6. The optical fibers 6 fixed on the probe base plate 7 is extended along the surface of the plate 7 and molded with the plate 7 by an insulating resin, for example, to form the optical probe 1.

Thus, the optical probe 1 has a thin plate shape formed of a probe base plate 7 having the honeycombed structure with a plurality of fiber insertion holes 7b into which a plurality of optical fibers 6 are fixed so that the tip ends thereof are arranged in a two-dimensional manner (arranged in an array). Since the optical probe 1 is thin and molded with an insulating resin, the optical probe 1 can be inserted into a narrow space formed between to mounted circuit boards 2a and 2b to detect the heat radiation state of the powered circuit board 2b at a real time basis.

The probe base plate 7 having the honeycombed structure is provided with a plurality of hexagonal holes 7a so that gases or lights can be passed through the hole 7a. When the optical probe 1 is inserted into a narrow space to be detected, heat flow or gas flow is not prevented significantly and undesired change of the heat generation state at the object to be detected is also prevented. Usually, when the mounted circuit boards, for example, are connected to a power source, the boards are cooled down by an air flow. Therefore, if the smooth air flow is prevented, the temperature of the mounted circuit board will be raised. However, when the optical probe 1 having the probe base plate formed according to the present embodiment is inserted between two mounted circuit boards, the cooling air flow is not prevented and there is no possibility that undesired temperature raise is occurred. Thus, the temperature distribution of the mounted circuit board in the practical use can be detected correctly.

The intensity of the output light of one optical fiber 6 represents a mean value of the infrared intensity included in the field of view of the optical fiber 6 even if the temperature in the view angle θ of the optical fiber 6 is equal or unequal. Accordingly, when the view angle θ is made small by means of a convex lens 8 and when the density of the optical fiber 6 is increased by increasing a number of optical fibers per a unit area, it is possible to detect the temperature distribution more precisely.

When the optical probe 1 is inserted into the narrow space between the mounted circuit boards 2a and 2b, the infrared light irradiated from the mounted circuit board 2b from which the temperature distribution is to be detected is guided to the light output section 1A via the optical fibers 6 inserted in the narrow space. The light output section 1A is coupled with an infrared camera 3 at which a temperature signal corresponding to the intensity of the infrared light guided by the optical probe 1 is obtained. The signal representing the temperature distribution of the circuit board 2b generated at the infrared camera 3 is supplied to a display device 5 via a signal line 4 as shown in FIG. 2 and a temperature distribution image of the circuit board 2b is displayed. As shown in FIG. 1, the temperature distribution images 5Ia, 5Ib of the electronic elements ep are displayed in addition to the pseudo-isothermal lines 5Ga, 5Gb.

As a result, the heat generation state of the circuit board 2b can be detected at a real time basis, even if the temperature change of the circuit board 2b occurs at a short period of time. When the optical probe 1 according to the embodiment is inserted between circuit boards mounted in a housing of a control panel, it is possible to detect or monitor the heat generation state of the circuit boards, thereby enabling the abnormal state of the electronic elements mounted on the circuit boards. If a structure positioned in a narrow space is heated at a high temperature and has a crack, the temperature at the crack is low in comparison with the other part of the structure. Therefore, when the temperature distribution image of the structure is displayed, it is easy and safety to detect the crack using the optical probe 1 according to the present invention. Further, since the optical probe 1 has no moving part and coated with an insulation material, it is possible to detect the temperature distribution of the power supplied circuit board without damaging the circuit board.

Figure 5:
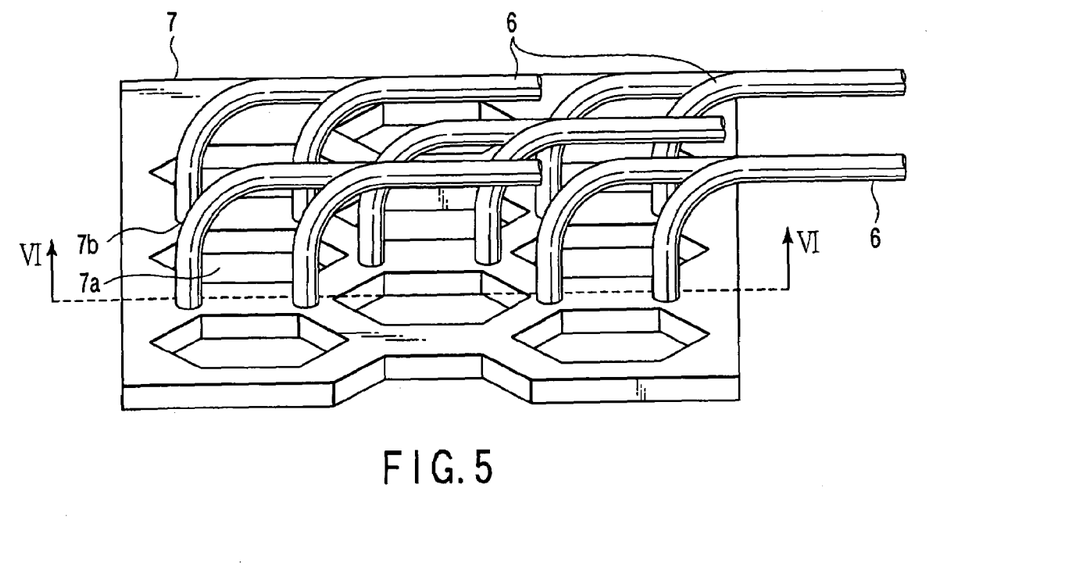
FIG. 5 is a perspective and enlarged view of a part of the optical probe shown in FIG. 1.
Figure 9:
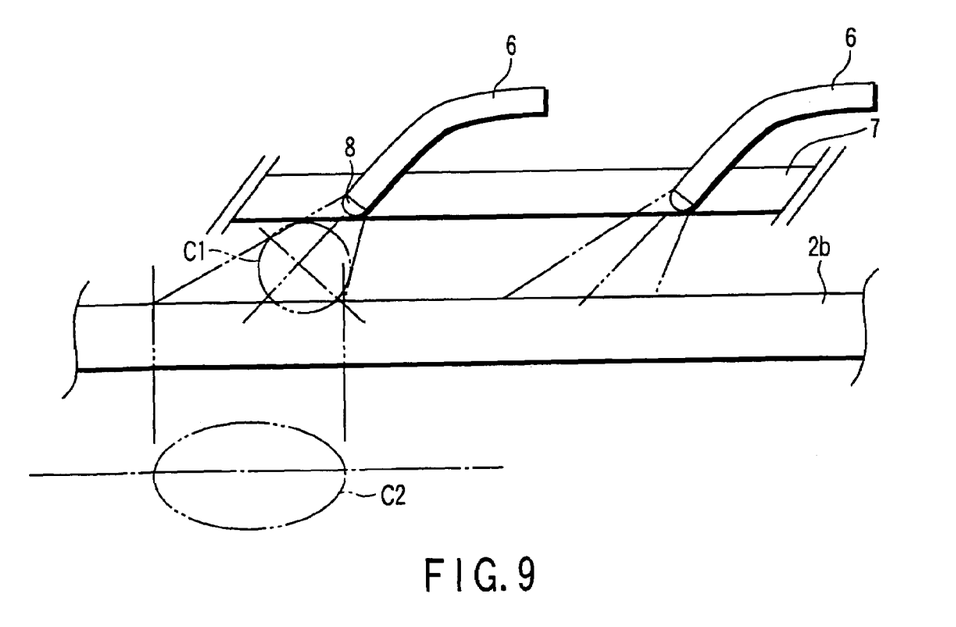
FIG. 9 is an enlarged view of a light receiving section of an optical fiber in the optical probe shown in FIG. 7.

The optical probe 1 shown in FIG. 5 has optical fibers 6 each having an optical axis fixed perpendicularly to the surface of the probe base plate 7. Further, in the embodiment shown in FIG. 7, the optical axis of each optical fiber 6 is inclined with respect to the surface of the probe base plate 7 at a predetermined angle. As can be seen from FIG. 9, when the optical fiber 6 is inclined, the field of view C2 of the fiber 6 is an ellipse and the view angle of the optical fiber 6 is θ. When the optical fiber 6 is fixed perpendicularly on the base plate 7, the field of view C1 thereof is a circle C1. Thus, the field of view C2 is larger than the field of view C1. As a result, when the optical fiber 6 is inclined, it is possible to widen the field of view per one optical fiber, and to cover the wide range of the circuit board 2b surface with a limited number of optical fibers 6. In the case of FIG. 9, an objective lens 8 is provided at the tip portion of the optical fiber 6 in the similar manner as in the case of FIG. 6.

Figures 8, 10:
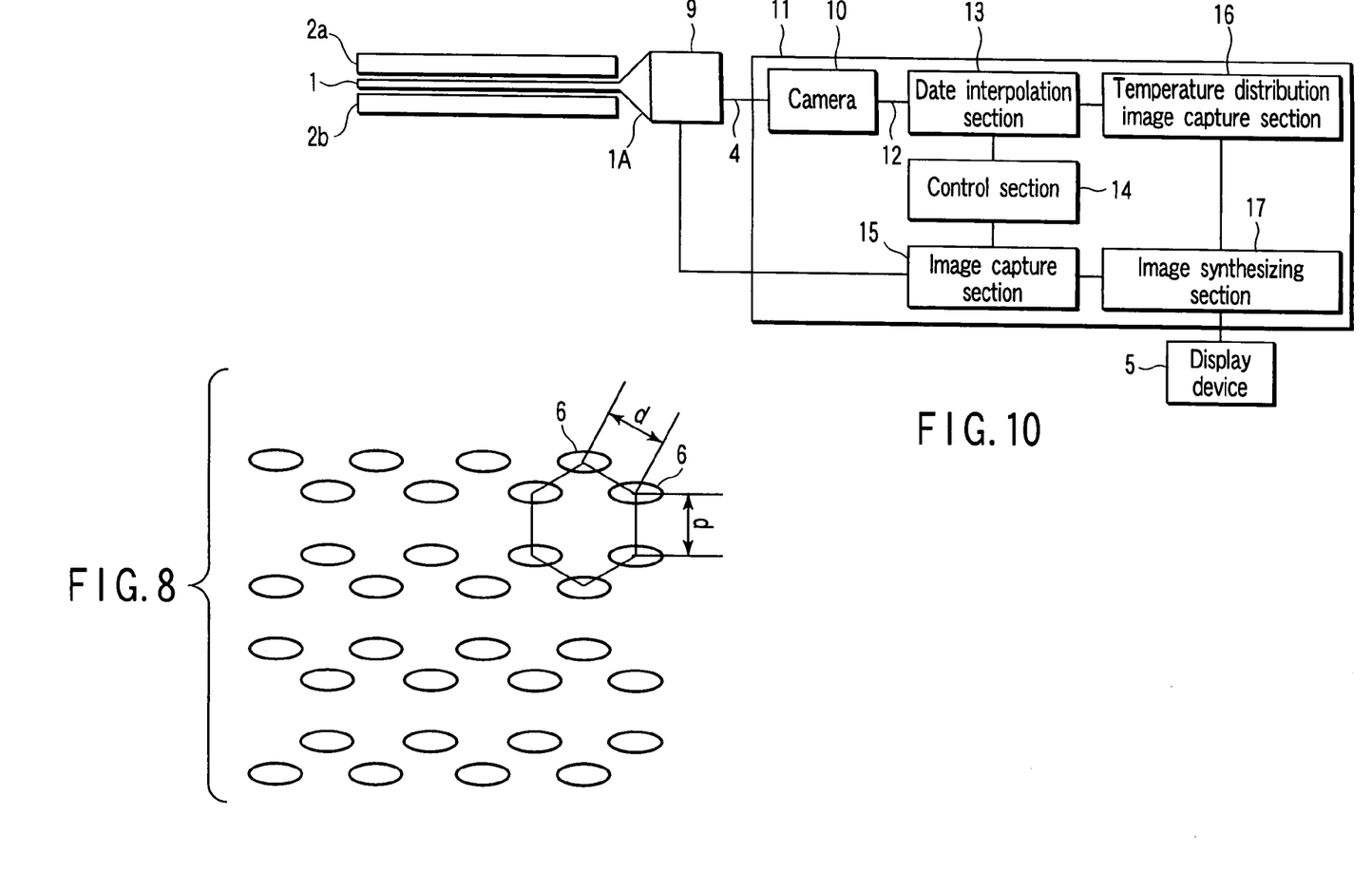
FIG. 8 is a plan view showing an arrangement of the light receiving section of the optical probe shown in FIG. 7.
FIG. 10 is a block diagram showing a structure of a temperature distribution detection device using an optical probe for the temperature distribution detection according to a still another embodiment of the present invention.

The circle C1 in FIG. 9 shows a field of view of the optical fiber 6 in the case of the embodiment of FIG. 5 and the circle or ellipse C2 shows a field of view on the mounted circuit board 2b having the optical axis thereof being inclined. Further, when the optical fiber 6 is fixed on the probe base plate 7 in an inclined state as shown in FIG. 9, the optical fibers. 6 can be extended along a near surface position of the plate 7 in comparison with a case in which the optical fibers 6 are fixed perpendicularly as shown in FIG. 6, thereby enabling to reduce the total thickness of the optical probe 1. Further, when the optical fibers 6 are inclined on the probe base plate 7, the total field of view of the optical probe 1 can be widened as shown in FIG. 8. In other words, it is possible to realize a wide field of view with less number of optical fibers. This means that a thin optical probe 1 can be provided using less number of optical fibers, thereby enabling to be inserted into a very narrow space. Since the optical probe 1 is constituted by a bundle of the optical fibers 6 of an insulation material, it can be used in a narrow space in an electronic device without rendering the electronic elements being damaged by short-circuiting, even if the optical fibers are not coated with an insulating resin and an electric power is supplied to the circuit boards. Thus, it is possible to detect the temperature distribution image even if an electric power is supplied to the circuit board.

Figure 7:
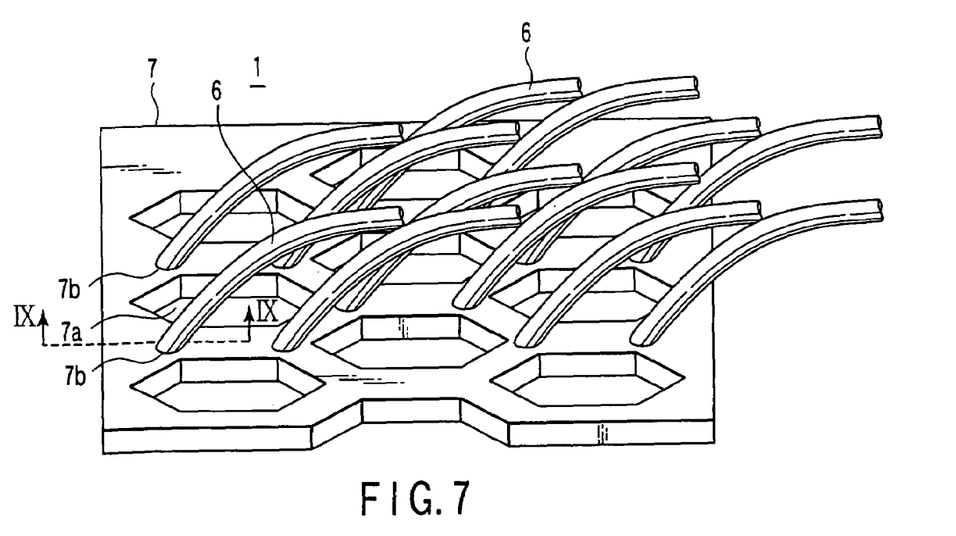
FIG. 7 is an enlarged perspective view showing a detailed structure of a tip part of the optical probe according to another embodiment of the present invention.

When quartz glass is used as a main component or a core of an optical fiber, the resultant optical fiber cannot be bended with a small radius. Therefore, when such an optical fiber 6 made of quartz glass is fixed perpendicularly on the light receiving surface of the probe 1 as shown in the embodiment of FIG. 5, the optical probe 1 becomes thick, and such a thick optical probe 1 cannot be inserted into a narrow space. The optical probe 1 shown in FIG. 7 is suitable to be used in a narrow space. However, when a space between two circuit boards is relatively wide, the optical probe 1 having the optical axes of a plurality of optical fibers 6 fixed perpendicularly on the probe base plate 7 as shown in FIG. 5 can be used. Accordingly, a wide field of view may be realized with a thin optical guiding means or the optical probe which can be used to detect a temperature distribution image in a narrow space. In the first embodiment, the optical fibers may be made of a material capable of transmitting an infrared light such as a silver halide system material, a fluoride glass, or a chalcogenide fiber, in addition to the quarts glass.

FIG. 8 is a schematic view for showing a field of view of the optical fibers 6 when six optical fibers 6 are arranged at apexes in a hexagonal shape and inclined on the mounted circuit board 2b which is an object to be detected by the optical probe 1. Since the optical axis of the optical fibers 6 is inclined with respect to the detection surface of the circuit board 2b, the field of view is the ellipse C2 which is larger than the corresponding circle field of view C1 of the optical fibers 6 shown in FIG. 5 embodiment. In the embodiment of FIG. 8, the distance d between each two adjacent optical fibers 6 is set to be equal, so that it is easy to extract an intermediate temperature value between two adjacent optical fibers by means of an interpolation method.

In the case of FIG. 8, distances d of each adjacent two optical fibers arranged at each adjacent two apexes of the hexagonal are set to be equal, so that an intermediate temperature data between two adjacent optical fibers 6, 6 can be obtained by means of a known interpolation method using two items of data obtained from the two adjacent optical fibers.

FIG. 10 is a block diagram of a temperature distribution detection device 11 capable of displaying a synthesized image of a visible image and a temperature distribution image of the mounted circuit board 2b which is an object to be detected. Where, the optical probe 1 is composed of optical fibers having an optical characteristic which is capable of transmitting both the infrared light and a visible light.

The image pickup device or the image capture device 9 is composed of an infrared camera capable of detecting the temperature distribution from the received infrared lights and a CCD camera capable of capturing an image by receiving a visible light. The infrared camera and the CCD camera can be used selectively by means of the control unit 14. The normally visible image captured by the capture device 9 is transferred to the image capture unit 15. While, the infrared image obtained in the image capture device 9 is sent to the temperature distribution data capture unit 10. The obtained infrared image is converted to digital image data which is then transferred to the temperature image data interpolation unit 13 where data interpolation is performed to obtain intermediate data between two adjacent data obtained from two adjacent optical fibers. This interpolation is performed between two data obtained from two adjacent optical fibers 6, 6 to obtain intermediate data between the two adjacent optical fiber data as shown in FIG. 8, for example.

Figure 11A:
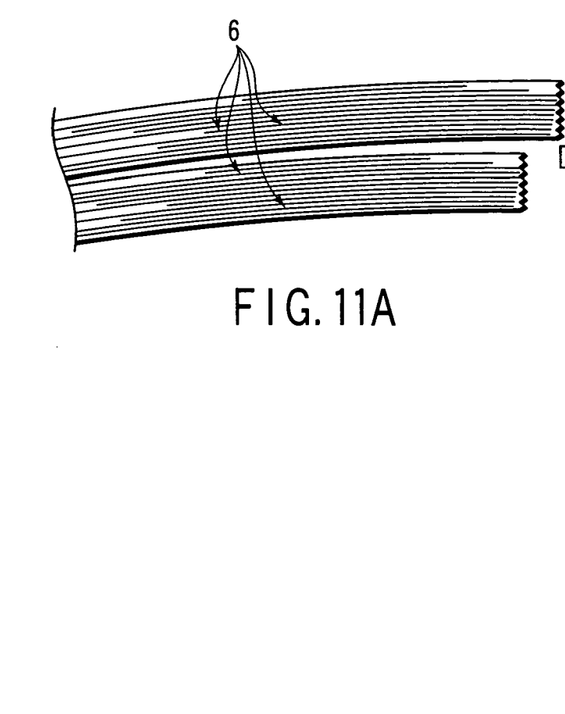
FIGS. 11A to 11C are diagrams for explaining the operation of the embodiment shown in FIG. 10.
Figure 11B:
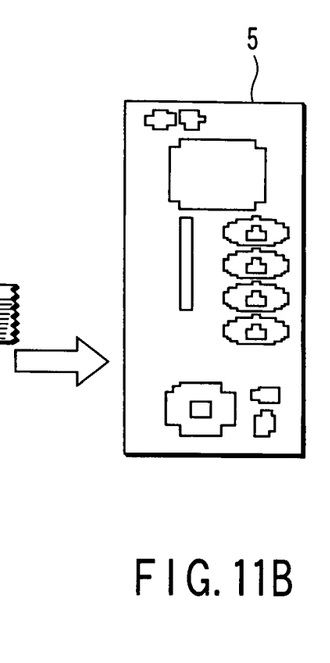
Figure 11C:
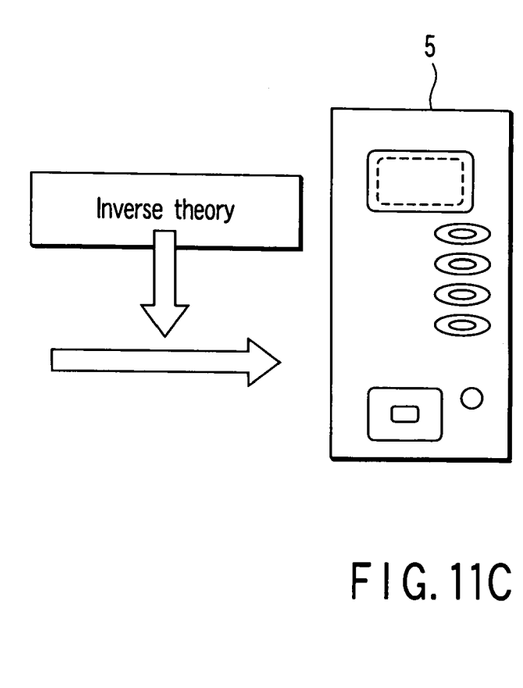

FIGS. 11A to 11C are diagrams schematically showing the operation of the device shown in FIG. 10. FIG. 11A shows sub-bundles of optical fibers 6 roughly arranged in the optical probe 1. FIG. 11B is one example for roughly showing a temperature distribution image captured by the infrared camera 3 based on the image taken out through the roughly arranged optical fibers 6. FIG. 11C shows a corrected image of FIG. 11B shown on the display device 5 obtained by the data interpolation between two adjacent image data pixels using the inverse theory.

The data interpolation method usable in the present invention may be any known method such as a mean value method, a two-dimensional spline interpolation method, Lagrangian interpolation method and another known method for interpolating a two-dimensional data. The temperature image data interpolated in the temperature image data interpolation unit 13 is transferred to the temperature distribution image capture unit 16. The transferred temperature distribution image and the normal visible image transferred to the image capture unit 15 are synthesized at the image synthesizing unit 17 by controlling the synchronism between the detection timing at the control unit 14. The synthesized image is sent to the display device 5 to display and detect the temperature image on the real time basis.

Figure 12A:
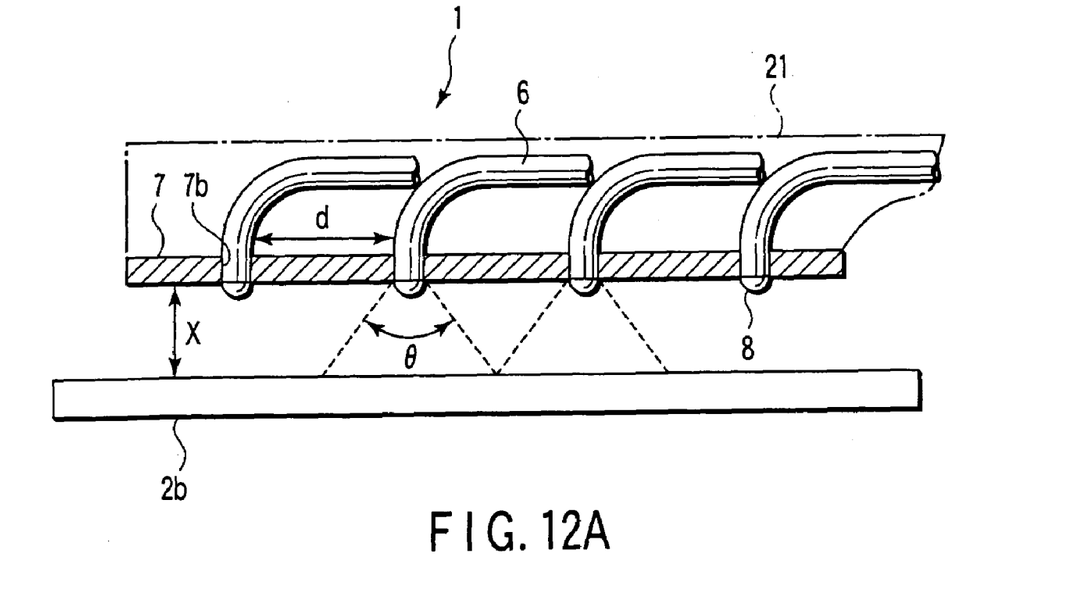
FIG. 12A is a sectional view showing a structure of a light receiving section of an optical probe according to a further embodiment of the present invention.

Now, further embodiments according to the present invention will be described. An optical probe 1 shown in FIG. 12A is composed of a probe base plate 7 formed of non-conductive material such as an insulation ceramic or a plastic and a plurality of optical fibers 6. The probe base plate 7 is provided with a plurality of through holes 7b to which the optical fibers 6 are fixed perpendicularly so that the light receiving tip of the optical fibers 6 are arranged in a two-dimensional manner. A visible image or an infrared image of an object 2b being detected is transmitted from the light receiving end of the optical probe 1 to the image output end of the optical fibers 6. A temperature distribution detection means such as an image capture device or an infrared camera 8 is coupled to the image output end of the optical fibers 6. The optical probe 1 is formed of optical fibers 6 coated with a non-conductive material such as vinyl chloride. The optical fibers 6 are made of non-conductive light transmission fiber material such as quarts glass or plastic.

The optical probe 1 is formed of a coating 21 of an insulation resin and the optical fiber 6 of non-conductive material, thereby acting as a non-conductive element. As a result, even when the electric power is supplied to the electronic elements mounted on the circuit board 2b, it is possible to insert the optical probe 1 into a narrow space in the circuit board 2b to detect the temperature distribution of the object 2b without occurring any accident such as short-circuiting.

The probe base plate 7 is formed of non-conductive material such as a ceramic or a plastic. Further, the objective lens 8 is also made of a non-conductive material. Therefore, it is possible to insert the optical probe 1 having the probe base plate 7 into the mounted circuit board 2b or a housing of the electric equipment to which electric power is supplied, thereby enabling to detect the temperature distribution or a wide range visible image at a real time basis.

FIG. 12A shows an optical probe 1 including an optical base plate 7, a plurality of optical fibers 6 arranged on the plate 7 with a distance d. The optical probe 1 is inserted near the circuit board 2b at a distance x at which the view angle $\theta$ with respect to the field of view of the optical fiber 6 including the objective lens 8 is set. The distance x is set as a focusing distance of the objective lens 8 provided at the tip of the optical fiber 6. In this case, when the distance d is set so as to satisfy the following equation, it is possible to obtain an image with at least no lack field of view along the arranging line of the optical fibers 6 in the image detection area.

$$d \leq 2 \cdot x \cdot \tan(\theta/2)$$

Figure 12B:
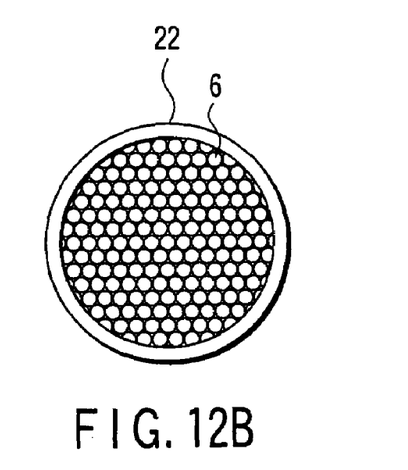
FIG. 12B is a sectional view showing a part at which the optical fibers of the optical probe shown in FIG. 12A are bundled.

FIG. 12B shows a bundle of the optical fibers 6 in the optical probe 1 at the light output section 1A according to a modification of the embodiment shown in FIG. 1. In the embodiment shown in FIG. 1, the optical fibers 6 are bundled as a square pillar shape as shown in FIG. 4, while, in the case of FIG. 12B, the optical fibers 6 are bundled as a column shape which is covered with an insulation layer 22 made of, for example, vinyl chloride. When it is necessary to separate the infrared camera 3 from the object being detected, namely, from narrow spaces formed among the plurality of mounted circuit boards 2a to 2d, in the case of the embodiment shown in FIG. 1, the optical probe 1 should be connected to the light output section 1A via an extended optical fibers 6 which is bundled as an optical cable as shown in FIG. 12B.

Figure 13A:
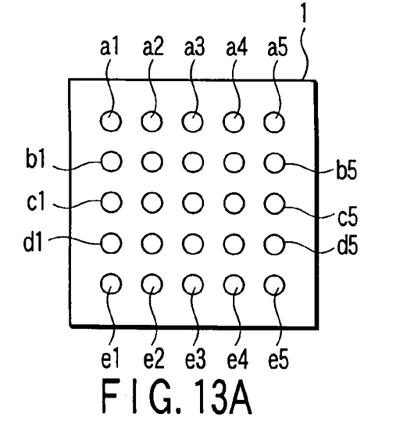
FIGS. 13A to 13C show, respectively, fiber arrangements of an objective side of the bundled fibers, of a bundled portion, and of an eyepiece side, in the optical probe.
Figure 13B:
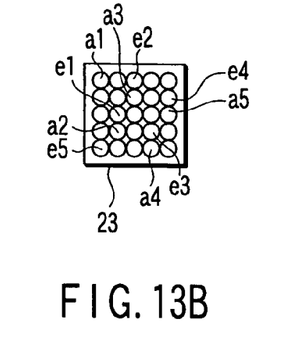
Figure 13C:
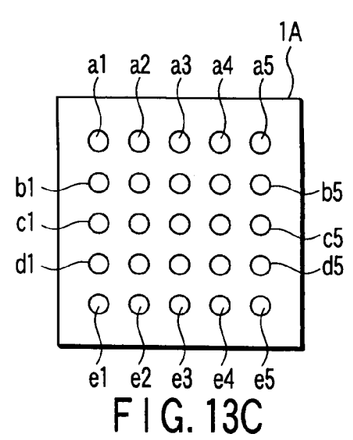

FIG. 13B shows a bundle of optical fibers 6 bundled as a bundle fiber 23 bundled as a square pillar which is connected between the optical probe 1 shown in FIG. 13A and the light output section 1A shown in FIG. 13C, according to another embodiment of the present invention. In this embodiment, 25 optical fibers a1 to a5, b1 to b5, c1 to c5, d1 to d5 and e1 to e5 are used in the optical probe 1 which has a light receiving surface of a matrix array of 5×5 pixels. The arrangement of 25 optical fibers a1 to e5 is also used in the eyepiece side or the light output section 1A, so that an image of 5×5 bits obtained at the optical probe 1 can be outputted from the light output section 1A. However, as shown in the figure, in the bundle fiber 23 at the intermediate image path, the arrangement of the optical fibers a1 to e5 is different from that of the optical probe 1 and light output section 1A. The meaning of this fiber arrangement will be described later by referring to the embodiment of FIGS. 15A to 15C.

Figure 14A:
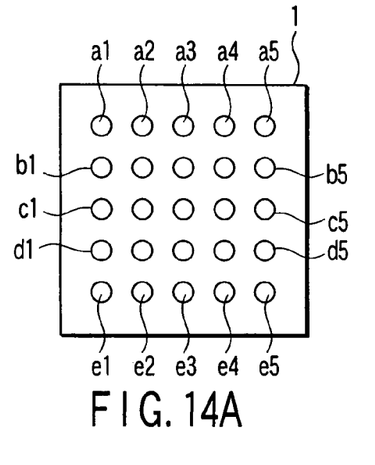
FIG. 14A to 14C show, respectively, fiber arrangements of the bundled fibers shown in FIG. 13A to 13C.
Figure 14B:
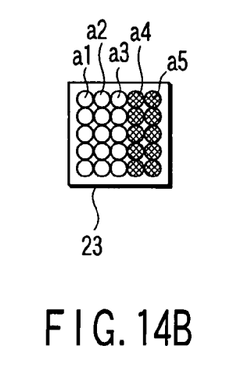
Figure 14C:
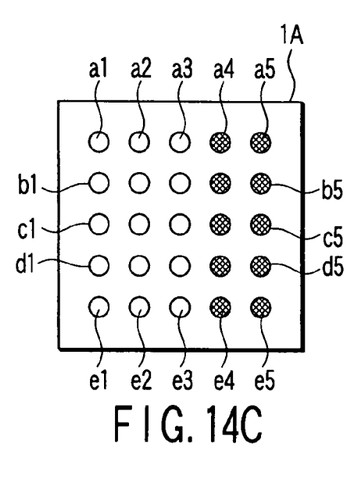

In the example of FIGS. 14A to 14C, the bundle fiber 23 has the same fiber arrangement as the optical probe 1 and the light output section 1A. FIG. 14B shows a case where two columns of optical fibers arranged at the right side in the figure are broken by some cause. The broken or damaged optical fibers are shown by the crossed hatching lines in FIG. 14B. This damage may be caused by the kink of the bundle fiber 23 or caused by a strike of a rigid part to the right side of the bundle fiber 23, for example. When two columns of optical fibers are broken as shown in FIG. 14B, the light guided in the corresponding fibers from the optical probe 1 is cut at the broken portions of the damaged fibers, so that 10 image pixels corresponding to the broken 10 optical fibers do not reach the light output section 1A and the corresponding two columns of image information cannot be reproduced on the image receiving side, as shown in FIG. 14C.

Figure 15A:
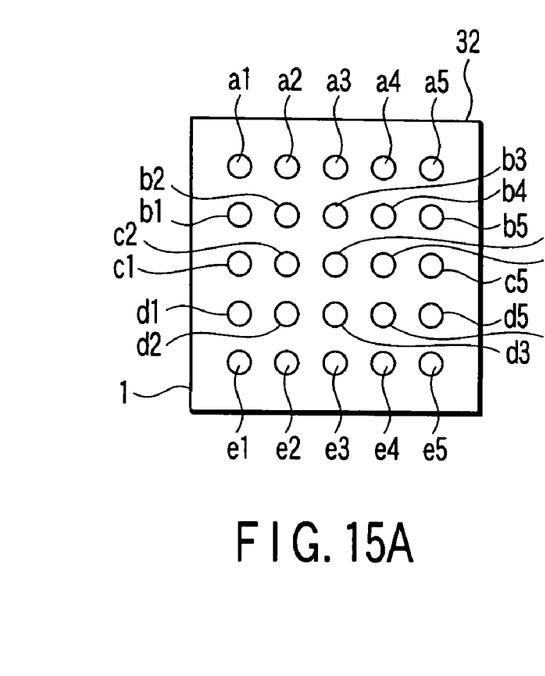
FIG. 15A to 15C show, respectively, fiber arrangements of bundled fibers according to another embodiment of the present invention.
Figure 15B:
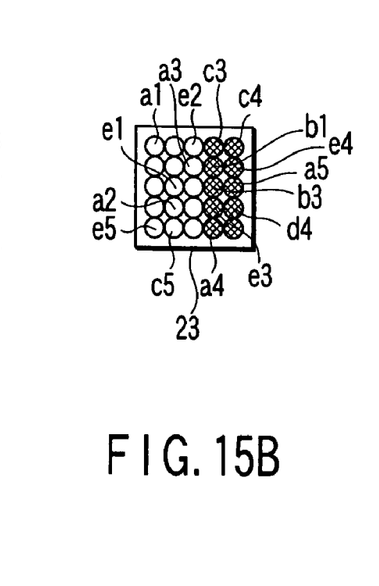
Figure 15C:
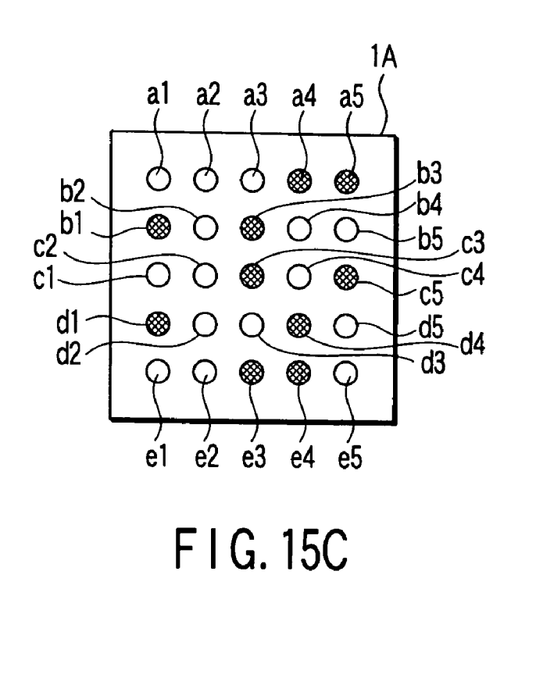

On the contrary, in the embodiment shown in FIGS. 15A to 15C, the bundled positions of the respective optical fibers are interchanged at the bundle fiber section 23 as shown in FIG. 15B with respect to the bundled positions of the optical fibers 6 at the optical probe 1 and at the light output section 1A, as shown in FIGS. 15A and 15C. In this case, even if the same two columns of optical fibers in the bundle fiber section 23 are damaged as shown in FIG. 15B, the deceased bits are dispersed in the received image on the light receiving section 1A, so that a case wherein a partial image corresponding to the 10 damaged optical fibers is not displayed can be prevented. Further, when an interpolation method is applied to the image shown in FIG. 15C, a deceased bit image between any adjacent active two bit images may be generated. According to the embodiment shown in FIGS. 15A to 15C, even if some continuous optical fibers are damaged as shown in FIG. 15B, the bit images corresponding to the damaged fibers are dispersed in the output image at the light output section 1A by interchanging the arrangement of the optical fibers in the bundled fiber section 23 with respect to those in the light receiving optical probe 1 and in the light output section 1A, it is possible to prevent the quality of the output image from being decreased significantly.

Figure 16:
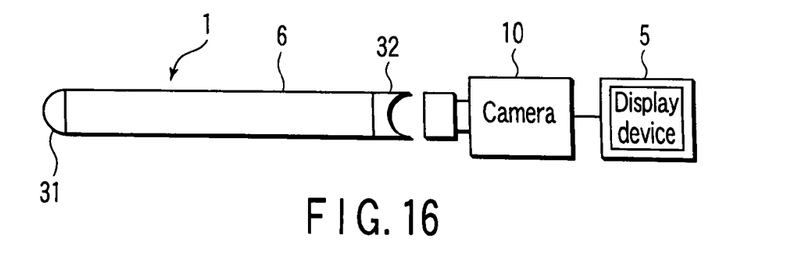
FIG. 16 is a block diagram showing a structure of an image detection device of further embodiment of the present invention using a fisheye lens.

In the embodiment shown in FIG. 16, objective fisheye lenses 31 are provided at the tip portion of the respective optical fibers 6 at the light receiving side of the optical probe 1. In the figure, an optical fiber 6 with a fisheye lens 31 is shown typically. According to this fisheye lens 31, it is possible to widen the view angle of a field of view of the optical fiber 6 at the light receiving side. As a result, the field of view per one optical fiber can be increased, thereby decreasing the number of optical fibers used in the optical probe 1. Further, when the field of views of the respective optical fibers are somewhat overlapped, it is possible to decrease the blind portions of the optical probe 1.

However, an image distortion may be occurred at the peripheral portions of the fisheye lens 31 and the resultant output image may have a barrel distortion. In order to compensate this barrel distortion, a compensation lens 32 having a bobbin-type distortion characteristic is coupled in the light output section of the optical fiber 6 to correct the output image. The distortion corrected image is captured at the camera 10 such as an infrared camera or a CCD camera to display at the display device 5 as a temperature distribution image or a visible image of the object to be detected. For example, the temperature distribution of the object at the narrow space can be detected and displayed as a numerical detection data or a pseudo contour line, thereby enabling to detect an abnormally heated point in a narrow space, for example. Thus, it is possible to detect any abnormal condition on the object in the narrow space. Further, since a temperature at a cracked portion on a high temperature pipe in a plant becomes low in comparison with a normal portion of the pipe, this may be displayed in a temperature distribution image, thereby enabling to detect the crack very rapidly and easily.

Further, since the heating condition in a narrow space can be detected at a real time basis, it is possible to detect instantly the temperature distribution of a mounted circuit board and the like wherein the temperature change is occurred at a short period of time. For example, when a plurality of mounted circuit boards are fixed in a housing of a control panel, it is possible to monitor the heat generation condition of the circuit boards and to detect the temperature of the boards, thereby enabling to detect the abnormal condition of the boards. Since no moving part is used in the optical probe or light sensor according to the embodiments of the present invention, which is made of a non-conductive material, it is possible to detect the temperature distribution on the mounted circuit board even if the circuit board is connected to an electric power source.

Figure 17:
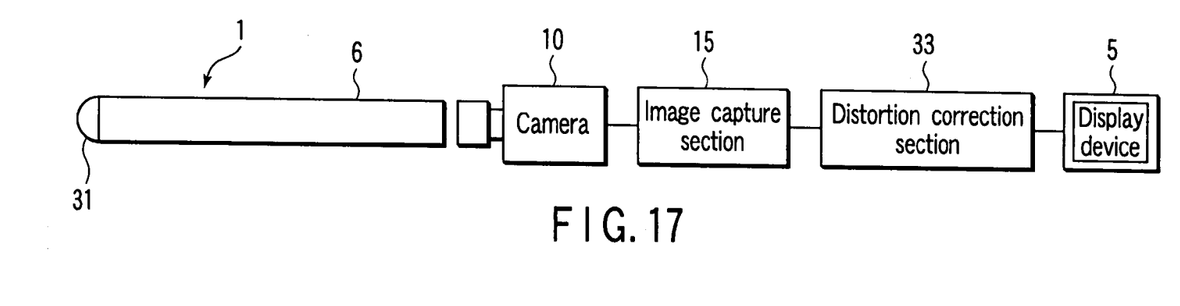
FIG. 17 is a block diagram showing a structure of the image detection device in which images captured through the fisheye lens are compensated, in the embodiment shown in FIG. 16.

In the embodiment shown in FIG. 17 the image picked up by the camera 10 is converted into a digital data at the image capture section 15. The digital image data thus obtained is then supplied to a distortion correction section 33 where by digital data is corrected by means of a software. The corrected data is supplied to a display device 5 to display a temperature distribution image or a visible image. The distortion correction section 33 may also be realized by means of a hardware circuit.

Figure 18:
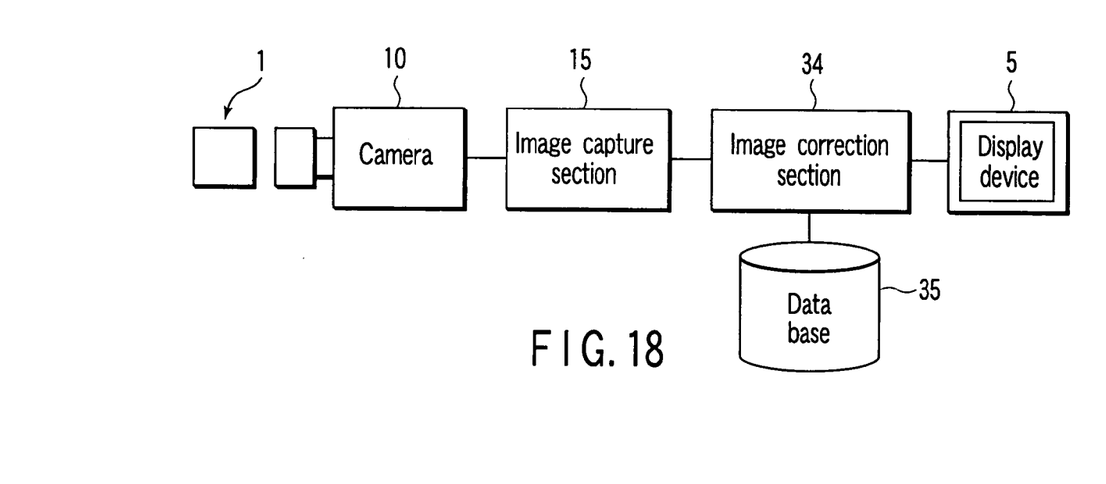
FIG. 18 is a block diagram showing a structure of a temperature distribution detection device according to a still further embodiment of the present invention in which the strength of the infrared light obtained through the optical probe is compensated.

FIG. 18 is a block diagram showing a light detection device according to another embodiment of the present invention for displaying correctly the temperature distribution image of an object to be detected by compensating the light intensity of the infrared light attenuated when the infrared light passes through the optical probe 1. When a quarts glass of plastic is used to make a light guiding section of the optical probe 1, a light in a wavelength range of a visible light may not be attenuated through the light guide. However, an infrared light in a wavelength range of 1 to 1000 μm passed in the light guide will be attenuated significantly. There is an infrared light transmissible optical fiber such as a material of a silver halide system. However, the light transmissivity is about 70% even in a wavelength range of 9 to 11 μm in which the attenuation is relatively small. Further, this silver halide system material is very expensive. Therefore, it is very difficult to use this material as a light transmission guide or optical fiber for guiding the infrared light image from a narrow space.

The optical probe 1 shown in the embodiment of FIG. 18 is composed of a generally used quarts glass or plastic as a light guiding material. The infrared distribution image of an object guided by the optical probe 1 is converted into a temperature image by means of a camera 10 such as an infrared camera. The temperature image obtained at the camera 10 is converted into a digital data at the image capture section 15 and sent to a temperature image correction section 34. The temperature image correction section 34 fetches the corresponding attenuation characteristic data from a data base 35 for storing a plurality of attenuation characteristic data for each of the light transmission material. The temperature image correction section 34 performs the data correction operation based on the fetched attenuation characteristic data which corresponds to the material used in the light guide in the optical probe 1. Namely, the intensity of the detected infrared light is corrected to output the corrected temperature distribution image. The corrected temperature distribution data is displayed on the display device 5 as a temperature distribution image.

Figure 19A:
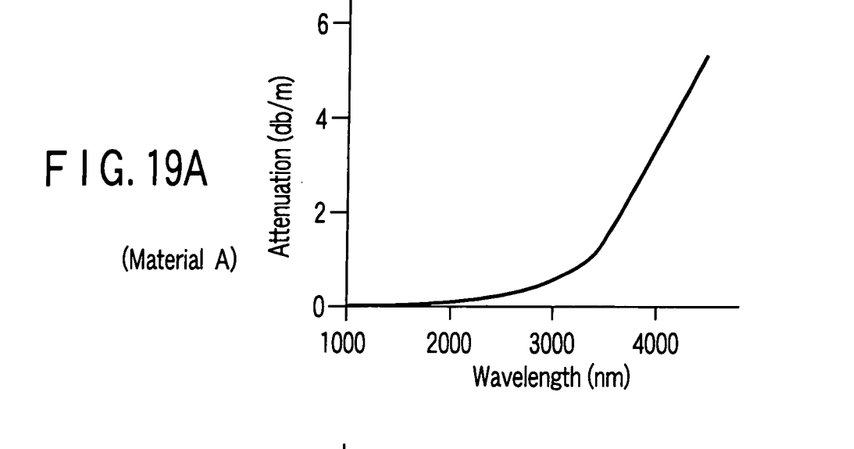
FIGS. 19A to 19C are graphs respectively showing data bases of light guiding materials.
Figure 19B:
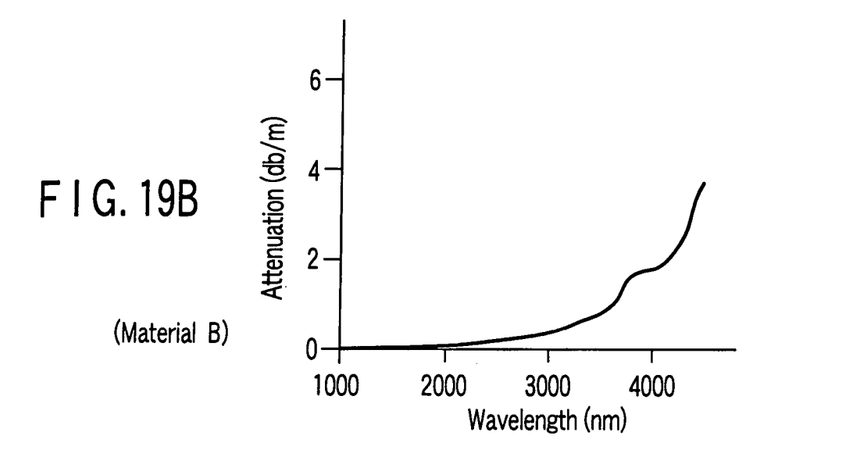
Figure 19C:
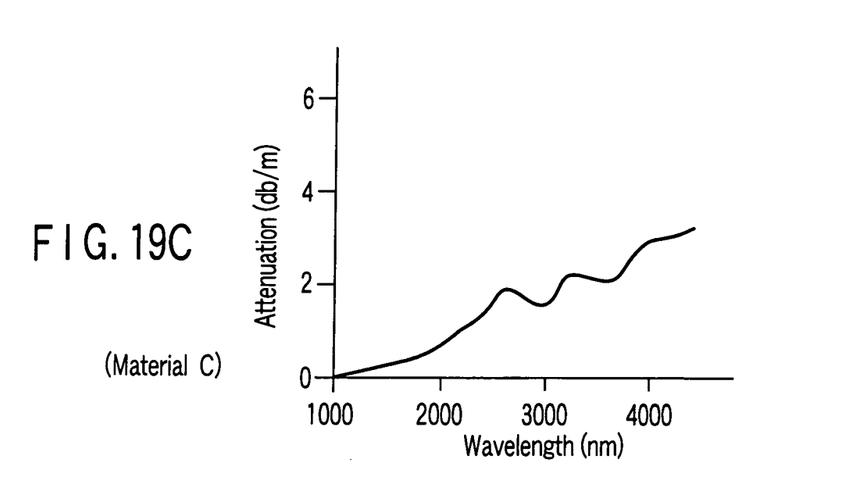

FIGS. 19A, 19B and 19C show examples of the light intensity attenuation data of materials A, b and C stored in the light guiding material data base 35.

Figure 20:
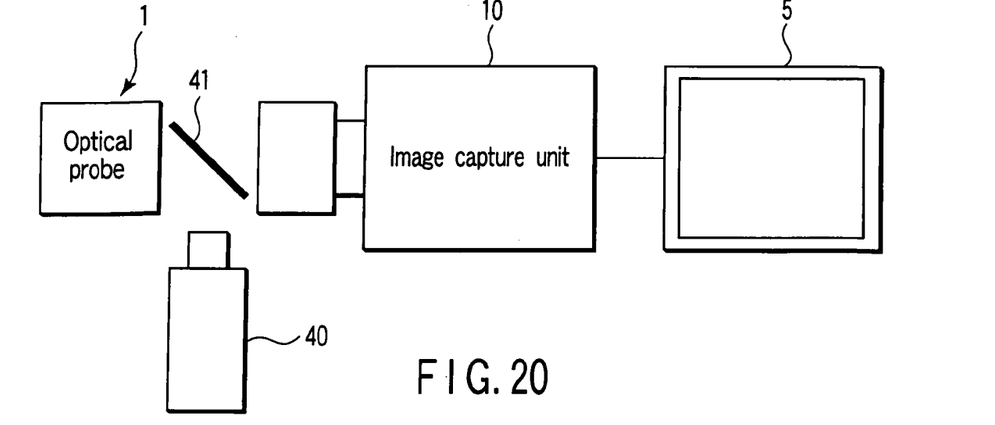
FIG. 20 is a block diagram showing a structure of an image detection device according to a further embodiment of the present invention in which a light is supplied to an end portion of an optical probe.
Figure 21A:
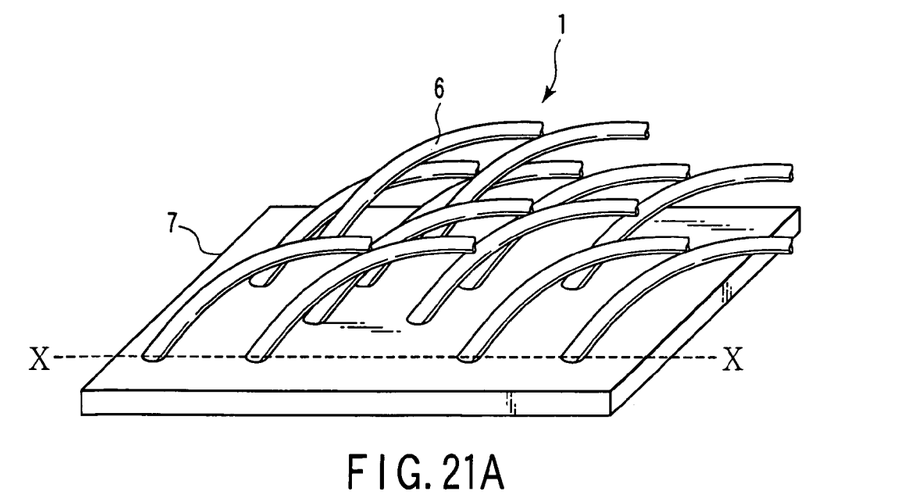
FIG. 21A is a perspective view showing a structure of an optical probe having a base plate made of a light storing material for fixing optical fibers according to another embodiment of the present invention.
Figure 21B:
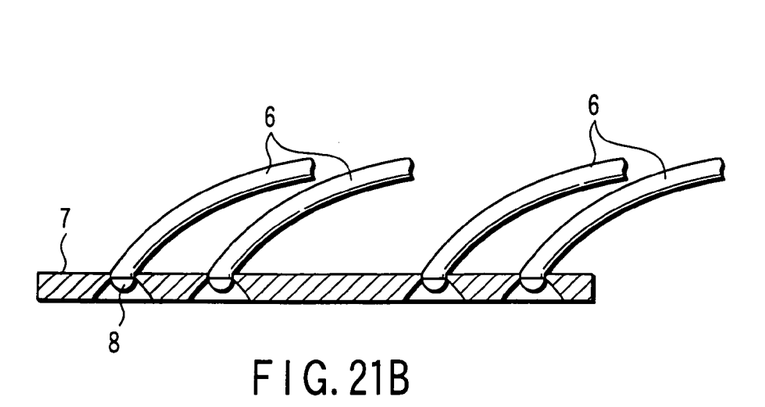
FIG. 21B is a sectional view showing a sectional structure of part of the device shown in FIG. 21A.

FIG. 20 is a block diagram showing a further embodiment of the present invention which comprises means for guiding a visible light for illuminating an object to be detected from a light output section side to a light receiving section side of the optical probe 1, and a display device for displaying an image of the object. FIGS. 21A and 21B show an optical probe 1 composed of a probe base plate 7 formed of a material including a light luminescent material. The probe base plate 7 is made of a material having a light luminescent characteristic when it is illuminated and energized with a light energy at a light receiving side of the optical probe 1 for fixing light receiving end of the optical fiber 6 on the probe base plate 7. Thus, when the optical probe 1 thus constructed is inserted in an object to be detected, the object is supplied with light energy or is illuminated by a light irradiated from the optical probe 1, prior to the starting of the image detection operation. The light reflected from the object is received by the probe base plate 7 to store therein the light energy. Alternatively, the optical probe 1 may be illuminated before it is inserted into a narrow detection space to store the light energy. In this case, there is no need for providing a light source in the embodiment of FIG. 20.

The supply of the light energy to the probe base plate 7 may be done by guiding a light generated form the light source 40 to the tip of the optical probe 1 via a half mirror 41. Since the half mirror 41 is made of a semitransparent material, after the light source 40 is turned off, a visible light is irradiated from the probe base plate 7 to illuminate the object, and the obtained visible image is guided through the optical probe 1 to reach the camera 10 such as a CCD camera. The image captured at the camera 10 is displayed on the display device 5 as a visible image.

<Modifications>

The present invention can be applied to a variety of embodiments or modifications without limiting to the described embodiments. For example, the temperature distribution at the narrow space may be recorded and displayed on the display device 5 as a numerical data or a graph other than the described graph showing a pseudo contour line and the like. In the described embodiments, the probe base plate 7 of a honeycombed structure is used to a supporting frame of the optical fibers 6. It is further possible to use other than such a honeycombed frame 7 provided that the end portions of a plurality of optical fibers 6 can be arranged at equal distances.

In the embodiments shown in FIGS. 5 and 7, the optical fibers 6 are arranged on frame portions of the honeycombed structure. The arrangement of the optical fibers 6 on the surface of the probe base plate 7 may be changed to be at positions such as apex points of a square or a hexagon, for example, provided that the optical fibers are arranged at substantially equal distances. The optical fibers 6 may be of a structure in which a plurality of elemental thin optical fibers are bundled as an optical fiber, or a single optical fiber having a desired diameter.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photo-detection device comprising:
   a base plate made of an insulation material and having a plurality of through holes formed in the base plate at a substantially equal distance;
   a plurality of optical fibers each having one end including a light receiving section from an object to be detected inserted and fixed to the respective through holes and another end provided with a light output section; and
   a light detection section connected to the light output section,
      wherein an optical axis of the optical fiber at the light receiving section is fixed in an inclined manner with respect to a surface of the base plate.

2. A photo-detection device according to claim 1, further comprising an objective lens provided at a tip of the optical fiber in the light receiving section.

3. A photo-detection device according to claim 1, wherein a plurality of through holes are formed in the base plate, the through holes being so arranged that fluid as well as infrared light can pass the through holes.

4. A photo-detection device according to claim 1, wherein the plurality of optical fibers are bundled to form a fiber bundle between the light receiving section and the light output section; and
   the positions of the optical fibers in the light receiving section are aligned with the corresponding positions of the optical fibers in the light output section, and the positions of the optical fibers in the fiber bundle section are arranged randomly.

5. A photo-detection device according to claim 1, wherein the base plate is a flexible base plate.

6. A photo-detection device comprising:
   a base plate made of an insulation material and having a plurality of through holes formed in the base plate at a substantially equal distance;
   a plurality of optical fibers each having one end including a light receiving section from an object to be detected inserted and fixed to the respective through holes and another end provided with a light output section; and
   a light detection section connected to the light output section,
      wherein a relationship among a distance d between the optical fibers on the base plate, a view angle θ of the optical fiber, and a distance x between the base plate and the object to be detected is satisfied in a following formula $d \leq 2 \cdot x \cdot \tan(\theta/2)$.

7. A temperature distribution detection device comprising:
   a detection base plate made of an insulation material and having a plurality of through holes formed at substantially the same distance;
   a plurality of optical fibers each having a light receiving section for receiving a light from an object to be detected at one end thereof, the one end being inserted and fixed into the through holes, and having a light output section at the other end;
   a light detection section connected to the light output section to form a light detection signal corresponding to an intensity of the light output from the light output section; and
   an image forming section for forming an image representing temperature distribution of the object in accordance with an output formed at the light detection section,
      wherein each of the optical fibers has a light transmission characteristic capable of transmitting an infrared light and a visible light;
   the light detection section is configured to generate a first electric signal corresponding to the infrared transmitted through the optical fiber, and a second electric signal corresponding to the visible light transmitted through the optical fiber; and
   the image forming section forms a temperature distribution image of the object based on the first electric signal and a visible image of the object based on the second electric signal.

8. A temperature distribution detection device according to claim 7, further comprising an illumination device including a light source and a half mirror configured to guide a light generated from the light source to the object to be detected via the optical fibers.

9. A temperature distribution detection device according to claim 7, wherein a tip of the optical fiber in the light receiving section is provided with a lens for increasing a view angle of the optical fiber, and which further comprises a distortion correction unit configured to correct a distortion of an image caused by using the lens.

10. A temperature distribution detection device according to claim 7, which further comprises a data base for storing data representing light attenuation characteristics in an infrared wavelength range in which an infrared light having a wavelength included in the range is attenuated in the optical fiber, in order to correct the light intensity in the infrared wavelength range.

11. A temperature distribution detection device according to claim 7, wherein the base plate is made of an insulation material including a luminescent material.

12. A temperature distribution detection device according to claim 7, which further comprises an interpolation unit configured to interpolate an intermediate detection signal according to light detection signals obtained from adjacent optical fibers in the plurality of optical fibers using an interpolation method.

* * * * *